United States Patent [19]

Curtis et al.

[11] Patent Number: 5,166,906
[45] Date of Patent: Nov. 24, 1992

[54] TOWED UNDERWATER ACOUSTIC SPEED SENSOR

[75] Inventors: Christopher S. Curtis, New London; John T. Green, Lisbon; Thomas R. Stottlemyer, Mystic; Gregory T. Wasik, Voluntown, all of Conn.

[73] Assignee: The United States of America as represented by the Secretary of the Navy, Washington, D.C.

[21] Appl. No.: 908,116

[22] Filed: Jul. 2, 1992

[51] Int. Cl.5 .......................................... H04B 11/00
[52] U.S. Cl. ..................... 367/134; 367/130; 367/106; 367/89
[58] Field of Search ................ 367/89, 90, 91, 106, 367/130, 134; 73/185, 187

[56] References Cited

U.S. PATENT DOCUMENTS 4,065,746 12/1977 Thompson .................. 367/134
4,324,135 4/1982 Peyton ........................ 367/134

Primary Examiner—Daniel T. Pihulic
Attorney, Agent, or Firm—Michael J. McGowan; Prithvi C. Lall; Michael F. Oglo

[57] ABSTRACT

A system for measuring the speed in water of an underwater towed array has a towbody connected in close proximity to the array by means of a rope drogue. The towbody has a freely turning propeller that turns a shaft that has a rotor magnet. Magnetic pulses from the rotor magnet are converted first to an electrical and then to an acoustical signal. The acoustical signal from the towbody is received by the towed array and converted back to an electrical signal that is transmitted along a line to a ship that is towing the array. The ship then displays the detected speed and/or utilizes the information received for control purposes.

4 Claims, 2 Drawing Sheets

TOWED UNDERWATER ACOUSTIC SPEED SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a speed measuring device. More particularly the invention is a device to accurately measure the speed of an array being towed through the water at operating depth.

(2) Description of the Prior Art

Towed array self-noise is directly related to the speed at which the array travels through the water. Therefore, the accuracy of the array speed measurement is a factor in the accuracy of the self-noise measurement. Towed array speed measurements at sea are usually determined by speed sensors on board the towing vessel. The speed of the towed array is assumed to be equal to the speed measured at the ship. However, because of the non-uniformity of currents between the ocean surface and bottom, a change in the direction of tow can cause the array speed and consequently the self-noise to vary although ship speed is held constant. The uncertainty in the array speed measurement affects the range of error for the array self-noise measurement. Measuring the speed at array depth improves array speed accuracy, which translates to an improvement in the accuracy of the towed array self-noise measurement.

One prior art system that did not rely on the ship's speed for determining the speed of an underwater device was described by Peyton in U.S. Pat. No. 4,324,135. Peyton, in order to find the speed of fishing gear trolled from a boat, teaches the use of a magnetic rotor affixed to a paddle in a towed device for sensing the speed of rotation of the paddle. The rotor opens and closes a switch in an electrical signal thereby providing pulses that are converted to acoustic signals. The acoustic signal is transmitted to a receiver unit on the ship. This arrangement for optimum performance requires special mounting of the acoustic sensor in the receiver unit as the acoustic sensor has a tendency to pitch and roll with respect of the transmitting unit. In addition the acoustic signal is transmitted a relatively long distance.

SUMMARY OF THE INVENTION

Accordingly, it is a general purpose and object of the present invention to provide an improved system for us in measuring the speed of a towed array. It is a further object to locate the measuring device in the vicinity of the towed array. Another object is to minimize the distance acoustical signals need to be transmitted by utilizing the features of a towed array that sense acoustic signals, convert them to electrical signals, and then transmit the electrical signals to a towing vessel. Further objects are that the device be suitable for underwater use, be compact, exhibit good stable fluid dynamics when towed underwater, and be relatively inexpensive.

These objects are accomplished with the present invention by providing a measuring device that is tethered from a towed array whose speed is to be measured. The measuring device is an acoustic speed sensor that has a propeller freely rotating on a shaft as the sensor is towed underwater. The shaft has a rotor magnet affixed that rotates in unison with the shaft. A Hall-Effect sensor is located adjacent the rotor magnet and generates an electrical signal of a frequency determined by the rotational velocity of the rotor magnet. The electrical signal is converted to an acoustic signal of the same frequency. The acoustic signal is detected by one or more hydrophones within the towed array and converted to an electrical signal that is transmitted to the towing vessel for indication and/or control purposes.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
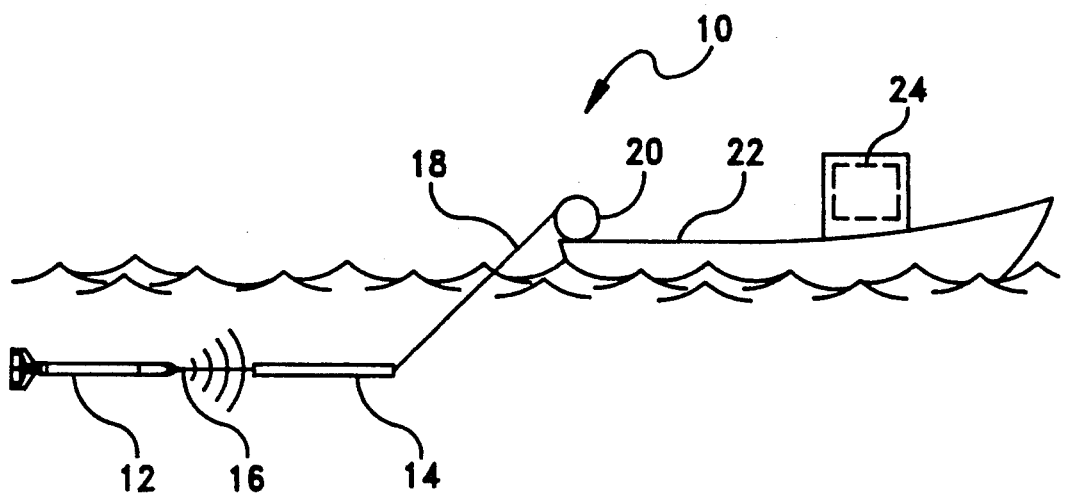
FIG. 1 is a diagram of an acoustic speed sensor system in accordance with the present invention.

Referring now to FIG. 1 there is generally shown an acoustic speed sensor system 10. The acoustic speed sensor system 10 comprises a towed speed sensor body 12 that is connected to a towed array 14 by means of a rope drogue 16. A tow cable 18 is payed out from a winch 20 on a ship 22. The ship 22 includes the necessary shipboard electronics 24 for the acoustic speed sensor system 10.

Figure 2:
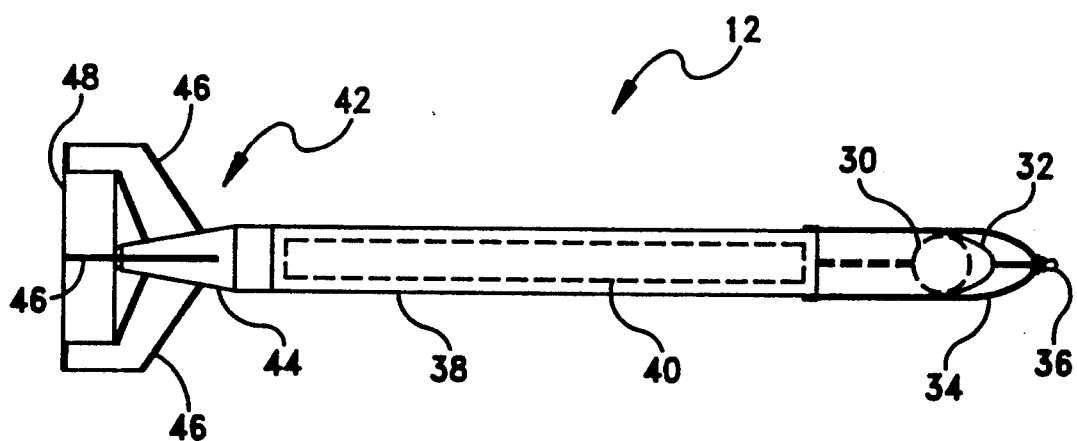
FIG. 2 is a more detailed representation of the towed speed sensor body shown in FIG. 1.

FIG. 2 shows a more detailed representation of the towed speed sensor body 12. The forward end of the towed speed sensor body 12, or towbody 12 as it is commonly called, comprises an acoustic transducer 30 cast in a urethane nose cone 32. Surrounding the nose cone 32 is a stainless steel towing cage 34. A metal ring 36 forms part of the towing cage 34. The rope drogue 16 of FIG. 1 is attached to the metal ring 36 of the towing cage 34. The towbody 12 is further comprised of an aluminum pressure cylinder 38 housing the towbody electronics 40. Shown at the aft end of the towbody 12 is a tail cone assembly 42. The components within the tail cone assembly 42 that are shown in FIG. 2 are a syntactic foam tail cone 44 with four fiberglass fins 46 and an aluminum propeller shroud 48.

Figure 3:
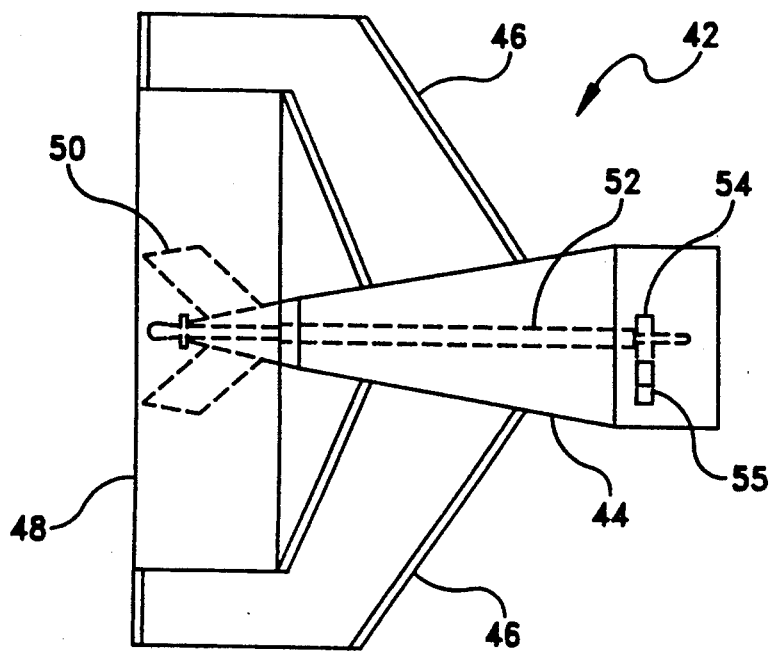
FIG. 3 is a more detailed diagram of the tail cone assembly portion of the towed speed sensor shown in FIGS. 1 and 2.

Refer now to FIG. 3 for a more detailed description of the tail cone assembly 42. Located at the aft end of the tail cone assembly 42 is a cast epoxy propeller 50 on a stainless steel shaft 52. The propeller shaft 52 rotates freely within the syntactic foam tail cone 44. The rotational velocity of the propeller 50 and hence the propeller shaft 52 is determined by the speed of the towbody 12 in the surrounding water. The four fiberglass fins 46, only two are shown for clarity in FIG. 3 and the aluminum propeller shroud 48 are for towbody stability and propeller protection. A multi-pole rotor magnet 54 is mounted on the forward end of the propeller shaft 52. A Hall-effect sensor 55 located adjacent to the rotor magnet 54 determines the frequency of the rotor magnetic pulses and generates a square wave signal in response. The Hall-effect sensor's output square wave signal varies with the frequency of the magnetic pulses of the rotor magnet 54. This frequency is determined by the rotational velocity of the propeller shaft 52 driven by the propeller 50. Hence, the square wave signal generated by the Hall-effect sensor 55 can be used to determine the speed of the towbody 12 in the surrounding water.

Figure 4:
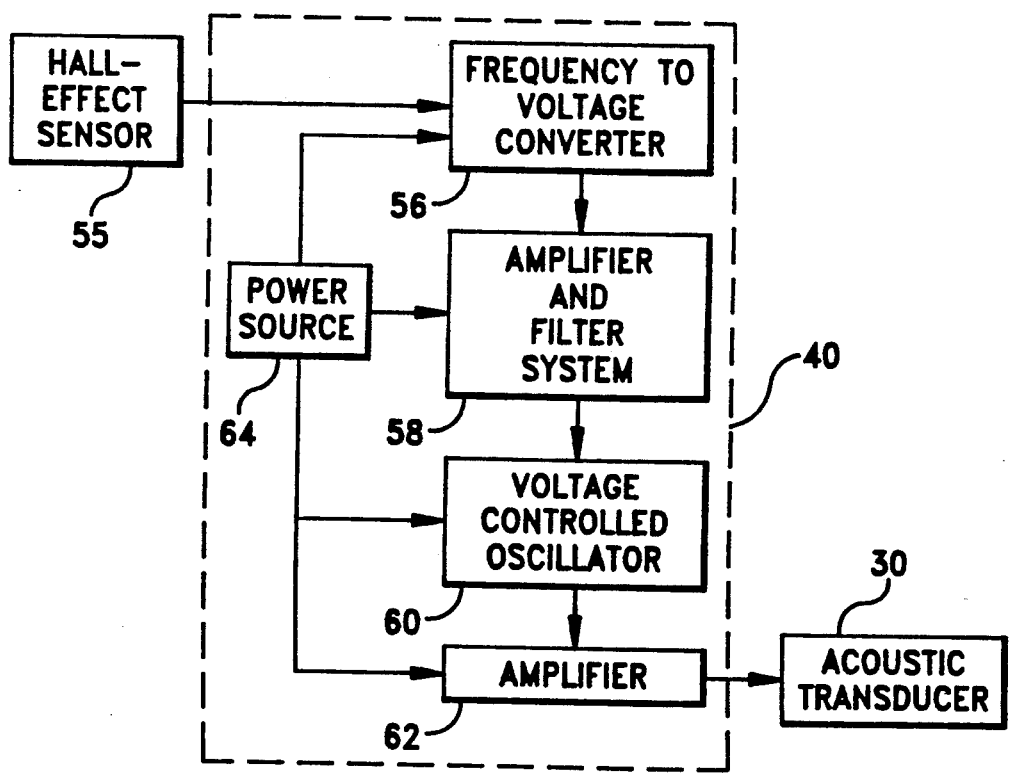
FIG. 4 is an electronics flow diagram of the towed underwater speed sensor of FIGS. 1 and 2.

Refer now to the electronics diagram of FIG. 4. The towbody electronics 40, that are housed within the aluminum pressure cylinder 38, shown in FIG. 2, receive the square wave signal from the Hall-effect sensor 55. The frequency to voltage converter 56 converts the frequency of the received square wave signal to an analog voltage. The voltage amplifier and filter system 58 filters the analog voltage and scales it to the correct input level for the voltage controlled oscillator (VCO) 60. The output signal from the VCO 60 is then amplified by amplifier 62 and applied to the acoustic transducer 30 that converts the electrical signal received to sound. A power source 64 is electrically connected to each of the components of towbody electronics 40 to provide required power thereto.

In operation as the towbody 12 is towed through the water, the propeller 50 turns at a rotational velocity proportional to the difference in speed between the towbody 12 and the water through which it is towed. The propeller 50 rotates its shaft 52 and the rotor magnet 54 which is affixed to the shaft 52. The Hall-effect sensor 55 located adjacent the rotor magnet 54 senses the frequency of the rotor magnet 54 and puts out a square wave signal in response. The electronics 40 then converts the frequency of the square wave signal to an amplified VCO signal. The amplified VCO signal is applied to the acoustic transducer 30. The transducer 30 transmits an acoustic signal into the ocean that is sensed by the nearby towed array 14 that is connected to the towbody 12 which houses the transducer 30. The towed array 14 converts the received acoustic signal to an electrical signal that is transmitted to the towing ship 22 via the tow cable 18. The shipboard electronics 24 then receives the signal and displays an indication of the speed and/or uses the signal for further processing by itself or in conjunction with other signals.

There has therefore been described a towed underwater speed sensor system 10 in which a towbody 12 that senses its own speed in water is placed in close proximity to the towed array 14 whose speed is desired. The towbody 12 then puts out an acoustic signal indicative of its speed to the nearby towed array 14. The towed array 12 converts the received acoustic signal to an electrical signal and transmits the electrical signal to the shipboard electronics 24 on the ship 22 that is towing the towed array 14 and towbody 12.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A towed speed sensor body comprising:
   a housing, including a nose cone, a tail cone assembly, and a cylinder connected intermediate said nose cone and said tail cone assembly;
   a towing cage connected to said housing;
   said tail cone assembly including a propeller, a propeller shaft connected to said propeller for rotating in unison with said propeller, a tail cone with said propeller shaft rotating freely within said tail cone, a plurality of fins connected to said tail cone, a shroud connected to said fins and located radially outward of said propeller for protecting said propeller, a rotor magnet, for emitting pulses, mounted on said propeller shaft, and a Hall-effect sensor located for sensing the frequency of said rotor magnet pulses and emitting a electrical signal in response;
   towed speed sensor electronics connected to receive said Hall-effect sensor electrical signal and converting the frequency of said received signal to an amplified oscillator output signal; and
   a transducer connected to said towed speed sensor electronics for converting said amplified oscillator output signal to a acoustic signal.

2. A towed speed sensor body according to claim 1 wherein said towed speed sensor electronics further comprises:
   a frequency to voltage converter for converting the frequency of said Hall-effect sensor signal to an analog signal;
   an amplifier and filter system for receiving said analog voltage and both filtering and scaling the analog voltage;
   a voltage controlled oscillator receiving said filtered and scaled analog voltage and providing a voltage controlled oscillator output signal; and
   an amplifier for amplifying said voltage controlled oscillator output signal and providing said amplified oscillator output signal; and
   a power source connected to supply power to said frequency to voltage converter, said amplifier and filter system,
   said voltage controlled oscillator, and said amplifier for amplifying said voltage controlled oscillator output signal.

3. A towed underwater acoustic speed sensor system comprising:
   a towed speed sensor body including a housing, including a nose cone, a tail cone assembly, a cylinder connected intermediate said nose cone and said tail cone assembly, a towing cage connected to said housing, said tail cone assembly including a propeller, a propeller shaft connected to said propeller for rotating in unison with said propeller, a tail cone with said propeller shaft rotating freely within said tail cone, a plurality of fins connected to said tail cone, a shroud connected to said fins and located radially outward of said propeller for protecting said propeller, a rotor magnet, for emitting pulses, mounted on said propeller shaft, and a Hall-effect sensor located for sensing the frequency of said rotor magnet pulses and emitting an electrical signal in response, towed speed sensor electronics connected to receive said Hall-effect sensor electrical signal and providing an amplified voltage controlled oscillator output signal in response and a transducer connected to said towed speed sensor electronics for converting said amplified voltage controlled oscillator output signal to an acoustic signal;
   a rope drogue with one end of said rope drogue connected to said towing cage for towing said towed speed sensor body;

a line array connected to the other end of said rope drogue for pulling said rope drogue, said line array being in close proximity with said towed speed sensor in order to have substantially the same speed as said towed speed sensor, said line array having acoustic detection means for detecting said acoustic signal and conversion means for converting said acoustic signal to a line array electrical signal;

towing and transmitting means connected to said line array for towing said line array and for transmitting said line array electrical signal; and shipboard electronics connected for receiving and processing said line array electrical signal.

4. A towed underwater acoustic speed sensor system according to claim 3 wherein said towed speed sensor electronics further comprises:

a frequency to voltage converter for converting the frequency of said Hall-effect sensor signal to an analog signal;

an amplifier and filter system for receiving said analog voltage and both filtering and scaling the analog voltage;

a voltage controlled oscillator receiving said filtered and scaled analog voltage and providing a voltage controlled oscillator output signal;

an amplifier for amplifying said voltage controlled oscillator output signal and providing said amplified oscillator output signal; and a power source connected to supply power to said frequency to voltage converter, said amplifier and filter system, said voltage controlled oscillator, and said amplifier for amplifying said voltage controlled oscillator output signal.

* * * * *